United States Patent [19]

Swearingin

[11] 4,312,298
[45] Jan. 26, 1982

[54] HOG FEEDING DEVICE OF IMPROVED DURABILITY

[76] Inventor: John D. Swearingin, R.R. 5, Carrollton, Mo. 64633

[21] Appl. No.: 135,018

[22] Filed: Mar. 28, 1980

[51] Int. Cl.³ .............................................. A01K 5/00
[52] U.S. Cl. ....................................................... 119/54
[58] Field of Search ...................... 119/53, 53.5, 52 R, 119/54, 58

[56] References Cited

U.S. PATENT DOCUMENTS

| | | | |
|---|---|---|---|
| 1,410,689 | 3/1922 | McCurdy | 119/53 |
| 1,701,338 | 2/1929 | Rowles | 119/54 |
| 1,822,289 | 9/1931 | Helmers | 119/53 |
| 2,371,617 | 3/1945 | Halverson | 119/52 R |
| 2,640,464 | 6/1953 | Jindrich | 119/54 |
| 2,943,601 | 7/1960 | Shank | 119/78 |
| 4,070,991 | 1/1978 | Schmiesing | 119/58 |

FOREIGN PATENT DOCUMENTS 2388493 11/1978 France ................................ 119/53

*Primary Examiner*—Gene Mancene
*Assistant Examiner*—Robert P. Swiatek
*Attorney, Agent, or Firm*—Norman B. Rainer

[57] ABSTRACT

A hog feeding device is provided comprised of a hopper assembly and underlying multi-compartment base unit. The parts of the device which are ordinarily subject to rapid deterioration, namely the base unit and the end walls of the hopper assembly, are fabricated from concrete as monolithic components. Because of special features of construction, the monolithic components can be easily fabricated, and the device can be readily assembled from its component parts.

11 Claims, 6 Drawing Figures

HOG FEEDING DEVICE OF IMPROVED DURABILITY

BACKGROUND OF THE INVENTION

This invention relates to an animal feeder, and more particularly to a hopper-type feeder especially suitable for the feeding of hogs.

Devices for the automatic, unattended feeding of hogs are in widespread use. Such devices as disclosed for example in U.S. Pat. No. 1,719,245 to Smidley, U.S. Pat. No. 2,974,634 to Williams, U.S. Pat. No. 3,120,835 to Kopps and U.S. Pat. No. 3,180,319 to France, et al, are generally comprised of a vertically disposed hopper which dispenses granular feed into an underlying trough structure. Although devices of such design have been found in general to perform effectively, their inability to endure the rigorous conditions imposed during use has caused their life expectancy to be relatively short.

The construction of a durable trough for use in watering of hogs has been disclosed in U.S. Pat. No. 2,943,601 to Shank wherein said trough is comprised of U-shaped concrete members. Although the trough of Shank is durable, its massive structure does not permit widespread commercial distribution, and its design is not compatible with the use of an automatic hopper unit.

It is accordingly an object of this invention to provide a controlled flow multiple hog feeder of improved durability, said feeder having an upright hopper and an underlying multi-compartmented trough adapted to receive granular feed at a controllable rate from said hopper.

It is another object to provide an animal feeder of the aforementioned nature having means for controlling the rate of flow of feed from said hopper to said trough.

It is a still further object of this invention to provide an animal feeder of the aforementioned nature comprised of structural components capable of being readily disassembled to facilitate shipment and replacement of worn or broken components.

These objects and other objects and advantages of the invention will be apparent from the following description.

SUMMARY OF THE INVENTION

The above and other beneficial objects and advantages are accomplished in accordance with the present invention by providing a feeding device comprising a compartmented base of monolithic construction fabricated from concrete, and a hopper assembly adapted to interactively engage with said base, said hopper assembly being comprised of two identical end panels of monolithic construction fabricated from concrete and two opposed side panels held in downwardly convergent angled disposition by said end panels and perpendicular thereto. In preferred embodiments, a vertically disposed partition panel may be centered between said side panels and horizontally coextensive therewith.

The base is comprised of a floor portion, two end walls and two side walls extending upwardly from said floor portion, said walls being in end to end communication to form a rectangular trough-like enclosure. A vertical divider wall is disposed parallel to said side walls and centered therebetween and a series of transverse walls extend perpendicularly between said side walls and divider wall to form feed holding compartments within said base disposed on both sides of said divider wall.

Attachment means associated with the outer face of each end wall of said base facilitate the joinder thereto of the end panels of said hopper in opposed parallel relationship. Rigid horizontally disposed members interengagingly span said opposed end panels adjacent the upper extremity thereof in a manner to prevent outward movement of said end panels and side panels which might otherwise occur from the weight of granular feed material confined within said hopper.

Downwardly disposed plates pivotably suspended adjacent the lowermost edge of said side panels extend into said feed holding compartments and serve to control the rate at which granular feed passes from said hopper into said compartments.

In a preferred embodiment adapted for outdoor use, a removable roof may be positioned atop said hopper, and pivoted covers downwardly sloped toward said end walls may be disposed over each feed holding compartment.

BRIEF DESCRIPTION OF THE DRAWINGS

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
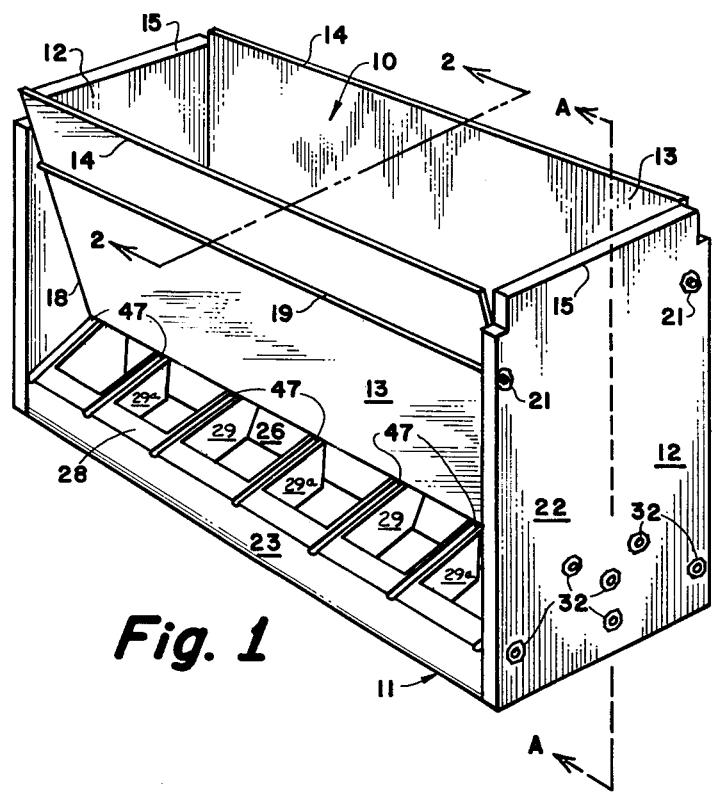
FIG. 1 is a perspective view of an embodiment of an assembled feeding device of the present invention.

Referring to FIG. 1, an assembled feeding device of the present invention is shown consisting of a hopper assembly 10 disposed above a base 11. Said hopper assembly is comprised of opposed identical end panels 12 and opposed rectangular side panels 13 disposed in a downwardly convergent manner about a longitudinal plane of symmetry A. The uppermost edges 14 of side panels 13 lie in substantially the same horizontal plane as the upper edges 15 of end panels 12.

Figure 2:
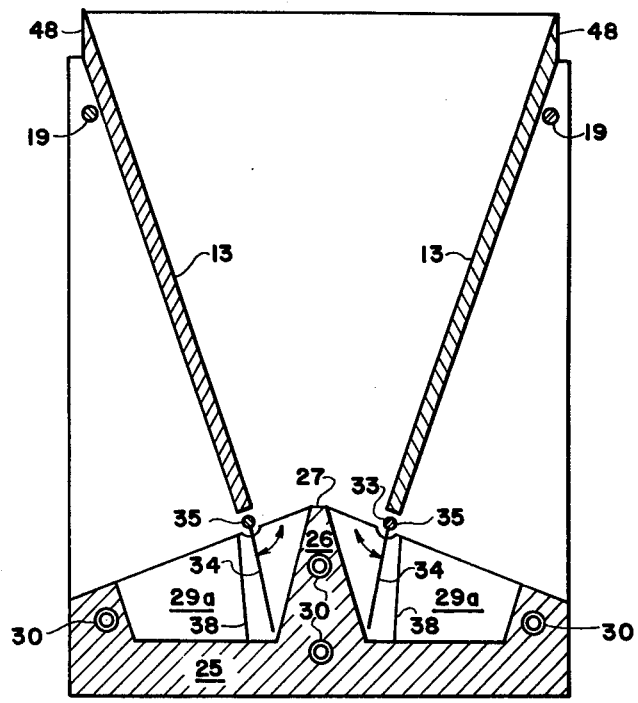
FIG. 2 is a vertical transverse sectional view taken along the line 2—2 of FIG. 1.
Figure 3:
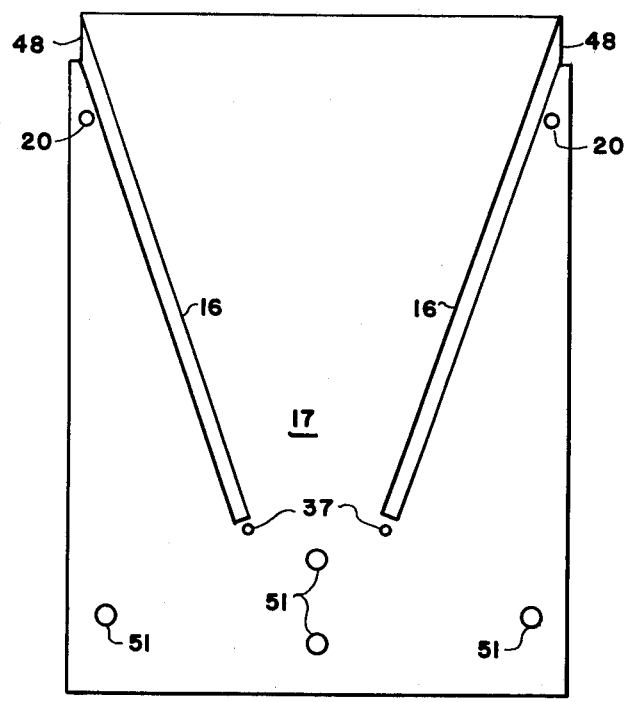
FIG. 3 is a plan view of the inside face of an end panel of the embodiment of FIG. 1.
Figure 4:
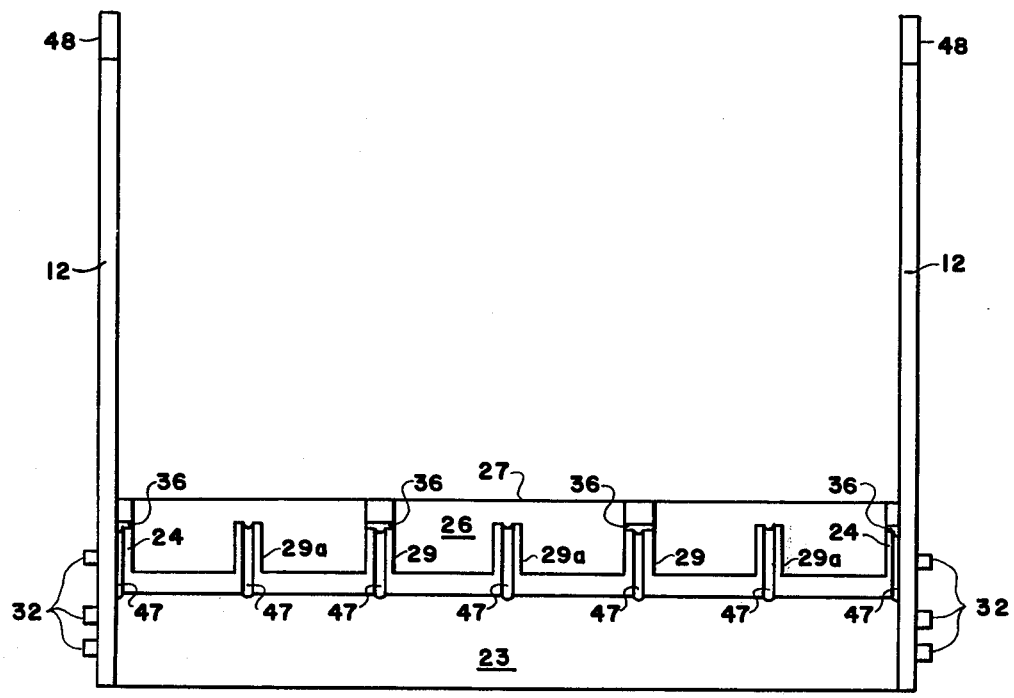
FIG. 4 is a side view of the embodiment of FIG. 1 with the side panels of the hopper removed.

As shown more clearly in FIGS. 2 and 3, grooves 16 are recessed within the inside faces 17 of end panels 12, said grooves serving to receive the vertical edges 18 of side panels 13 and thereby hold said panels in place. Upper spanning rods 19, extend horizontally between end panels 12, passing through upper apertures 20 in said panels to facilitate securement by bolts 21 on the outer faces 22 thereof. It is to be noted that placement of said upper spanning rods is such as to be in supporting contact with side panels 13 adjacent the upper edges thereof. The function of said upper spanning rods is therefore twofold, namely (1) to draw together end panels 12, and (2) to prevent outward movement of side panels 13.

End panels 12 are molded from concrete, whereas side panels 13 may be fabricated from plywood, plastic, metal or other rigid material of reasonable durability.

Figure 5:
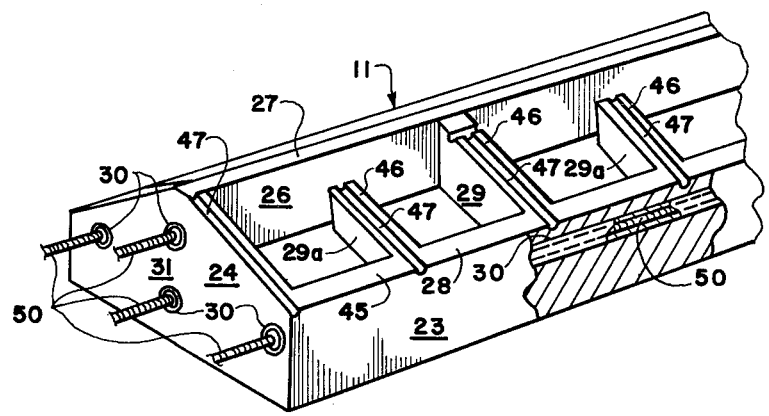
FIG. 5 is an enlarged fragmentary perspective view of the base with portions cut away to show internal detail.

The base 11 is made of concrete by a molding or casting operation. The overall configuration of the base is of such a nature that it can be cast in an upside down mode in a fixed integral open mold such that, upon curing, the base can be extricated from the mold by a simple vertical displacement. As shown most clearly in FIGS. 2 and 5, the base is an integral monolithic structure having a floor portion 25 with side walls 23 and end walls 24 upwardly extending therefrom to define a rectangular trough-like enclosure. A vertical divider wall 26 is disposed parallel to said side walls and centered therebetween. The upper edge 27 of said divider wall is at a higher elevation than the upper edges 28 of side walls 23. End walls 24 extend upwardly to meet the upper edge 27 of said divider wall, the end walls of the illustrated embodiment thereby having a pentagonal configuration. It is to be noted that the upper edges 28 of side walls 23 are tapered in an upwardly convergent manner.

A series of transverse walls 29 extend perpendicularly between side walls 23 and divider wall 26, thereby forming a series of compartments in said base. Every other transverse wall, designated 29a, terminates in a truncated inner end 38 separated from divider wall 26 for reasons which will be made apparent hereinafter.

Incorporated within the monolithic base are tubular conduits such as pipes 30 which horizontally traverse said base and terminate in outer faces 31 of end walls 24. Said pipes house connecting rods 50 adapted to pass through matching apertures 51 adjacent the lower extremes of end panels 12 of hopper assembly 10. Fastening means such as bolts 32 which engage the threaded ends of rods 50 enable said end panels 12 to be tightly drawn flush against the outer face 31 of end walls 24. Alternatively, connecting rods 50 may be of such length that two or more bases 11 may be joined in end to end abutting relationship, thereby forming a feeding device having a greater number of compartments between end panels 17.

The base incorporates feed adjusting means 33 comprised of a series of control plates 34 pivotally suspended from horizontally disposed support rods 35 which traverse the length of the base and are supportively positioned by grooves 36 in the upper surface of transverse walls 29 and end walls 24. The ends of rods 35 are supportively positioned by insertive engagement with apertures 37 in end panels 12. In the illustrated embodiment, each control plate extends across two adjacent compartments in said base and is adapted to swing in a plane perpendicular to the longitudinal plane of symmetry, as shown by the arrows in FIG. 2. The ability of a single plate to service two compartments is achieved by virtue of the fact that the plate extends through the space between divider wall 26 and the truncated ends of transverse walls 29a. Such manner of disposition of the control plates in conjunction with the design of the transverse walls also enables the truncated inner end 38 of transverse walls 29a to function as abutment means to prevent unrestricted outward movement of said control plates. The embodiment of feeder device illustrated in the drawings has six feeding compartments and three control plates on each side of divider wall 26. Other embodiments, within the purview of this invention, can be fabricated having different numbers of feeding compartments and control plates.

The design of the device of this invention is particularly amenable to simplified packaging for shipment, and assembly at a distant location. Once assembled, all joints are preferably sealed with a durable caulking material, especially if outdoor use is intended. Suitable caulking materials include those based upon silicone, polybutene or polysulfide materials. In addition to the aforementioned longitudinal plane of symmetry, it should be noted that a lateral plane of symmetry will generally exist taken perpendicular to said longitudinal plane at a point midlength of said feeder.

Figure 6:
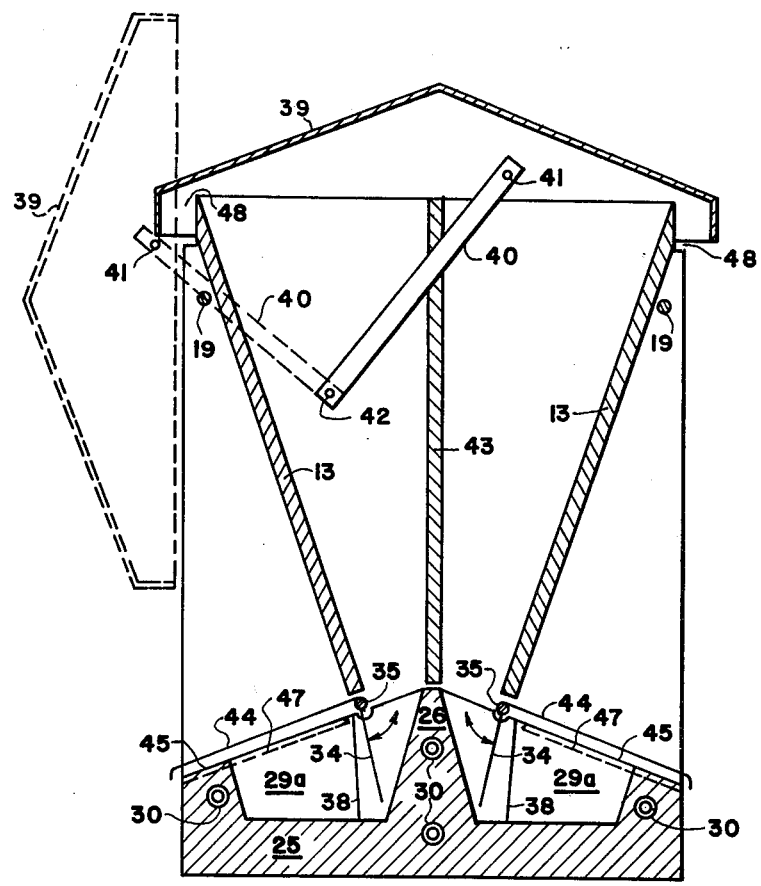
FIG. 6 is a vertical transverse sectional view of an alternative embodiment of the feeding device of this invention.

FIG. 6 illustrates an embodiment of assembled feeding device of this invention adapted for outdoor use and having a roof 39 which can be pivotably displaced to one side of the hopper by means of support arm 40 attached to pivot supports 41 in said roof and pivot supports 42 in the outside faces of end panels 12. The closed position of the roof is shown in full lines, while the open position is shown in dotted lines. Secure and accurate seating of said roof is assured by indented portions 48 formed in the upper side edges of end panels 12. Said indented portions may also serve to securely position an extension of said hopper assembly, said extension being a rectangular frame comprised of four vertically disposed panels and adapted to be mounted atop said hopper assembly.

A vertically centered partition panel 43 is exemplified in FIG. 6, its function being to achieve more uniform distribution of granular feed material within the hopper to each side of the base. Its placement and support may be achieved by grooves within the inside faces of end panels 12 in the manner already described with respect to side panels 13. A second function of partition panel 43 is to separate two different kinds of feed as when the feeding device is used in a fenceline and serves two different pens of hogs.

Pivoted lids 44, shown in FIG. 6 may be utilized to prevent entrance of rainwater into the feeding compartments of the base. Said lids may be pivotably supported by horizontal rods 35. Because of the coplanar, downwardly angled nature of the upper surfaces 46 of transverse walls 29 and upper surfaces 45 of side walls 23, the lids 44 can make a close-fitting closure above each compartment. Drain channels in the form of semi-circular grooves 47 may be incorporated into the upper surfaces 46 of said transverse walls to ensure that any water which flows laterally of said lids will be directed out of said base. It should be noted that grooves 47 in the upper surface of end walls 24 are ¼ circular in a manner permitting formation of a semicircular groove when two end walls are bought into abutment.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A device for the controlled delivery of granular feed material to hogs comprising a multi-compartmented base of monolithic construction fabricated from concrete, and an upright hopper assembly adapted to interactively engage with said base, said hopper assembly being comprised of two vertically disposed end panels of monolithic construction fabricated from concrete and two rectangular side panels held in opposed downwardly convergent disposition by grooves in said end panels and perpendicular thereto, said base being comprised of a floor portion, two opposed end walls and two opposed side walls, said walls extending upwardly from said floor portion to form a rectangular trough-like cavity, a divider wall extending upwardly from said floor portion parallel to said side walls and centered therebetween, and a series of transverse walls extending upwardly from said floor portion in perpendicular disposition between said side walls and divider wall to form compartments within said trough-like cavity disposed on both sides of said divider wall, removable, elongated lower fastening means passing through the end walls of said base and adapted for attachment to said end panels adjacent lower portions thereof, and upper fastening means adapted to interengage said end panels adjacent upper portions thereof while additionally providing abutment support for said side panels of said hopper.

2. The device of claim 1 wherein said divider wall of said base has an uppermost end which is disposed at a higher elevation than the uppermost ends of the side walls of said base.

3. The device of claim 2 wherein each alternative transverse wall of said base is truncated so as to define a gap adjacent said divider wall.

4. The device of claim 3 wherein pivotably suspended plates coextensive with said divider wall extend across two adjacent compartments, said plates passing through said gap adjacent said divider wall.

5. The device of claim 1 having a longitudinal plane of symmetry and wherein said lower fastening means is comprised of several connecting rods separately positioned within tubular conduits embedded within the concrete of said base, said rods extending outwardly from the end walls of said base in symmetrical disposition with respect to said plane of symmetry.

6. The device of claim 1 wherein at least two of said bases are joined in end to end abutting relationship by said lower fastening means comprised of several connecting rods separately positioned within tubular conduits embedded within said base, said rods extending outwardly from the end walls of said bases in symmetrical disposition with respect to said divider wall.

7. The device of claim 1 wherein the upper side edges of said end panels are provided with indented portions adapted to accurately seat a roof.

8. The device of claim 1 wherein the overall configuration of the base is such that it can be cast in an upside down mode in a mold such that it can be extricated from the mold by a simple vertical displacement.

9. A device for the controlled delivery of granular feed material to hogs comprising a multi-compartmented base of monolithic construction fabricated from concrete, and an upright hopper assembly adapted to interactively engage with said base, said hopper assembly being comprised of two vertically disposed end panels of monolithic construction fabricated from concrete and two rectangular side panels held in opposed downwardly convergent disposition by said end panels and perpendicular thereto, said base being comprised of a floor portion, two opposed end walls and two opposed side walls, said walls extending upwardly from said floor portion to form a rectangular trough-like cavity, a divider wall extending upwardly from said floor portion parallel to said side walls and centered therebetween, said divider wall having an uppermost end disposed at a higher elevation than the uppermost ends of said side walls, and a series of transverse walls extending upwardly from said floor portion in perpendicular disposition between said side walls and divider wall to form compartments within said trough-like cavity disposed on both sides of said divider wall, each alternative transverse wall being truncated so as to define a gap adjacent said divider wall, at least one support rod which horizontally traverses said base supportively positioned by said transverse walls, plates pivotably suspended from said support rod coextensively with said divider wall and extending through said gap across two adjacent compartments, lower fastening means associated with the end walls of said base adapted for attachment to said end panels adjacent lower portions thereof, and upper fastening means adapted to interengage said end panels adjacent upper portions thereof while additionally providing abutment support for said side panels of said hopper.

10. The device of claim 9 wherein lids are provided to cover said compartments, said lids being pivotably supported by said support rod.

11. The device of claim 10 wherein the upper surface of each transverse wall is provided with a groove adapted to conduct water downwardly out of said base.

* * * * *